United States Patent
Eisert et al.

(10) Patent No.: US 9,088,184 B2
(45) Date of Patent: Jul. 21, 2015

(54) DRIVE MOTOR HAVING INTEGRATED COOLING

(75) Inventors: Horst Eisert, Waldbuettelbrunn (DE); Detlef Kemmer, Alterheim (DE)

(73) Assignee: Brose Fahrzeugteile GmbH & Co. KG, Würzburg, Wuerzburg (DE)

( * ) Notice: Subject to any disclaimer, the term of this patent is extended or adjusted under 35 U.S.C. 154(b) by 83 days.

(21) Appl. No.: 13/130,732

(22) PCT Filed: Nov. 23, 2009
(Under 37 CFR 1.47)

(86) PCT No.: PCT/DE2009/001648
§ 371 (c)(1),
(2), (4) Date: Aug. 23, 2011

(87) PCT Pub. No.: WO2010/057482
PCT Pub. Date: May 27, 2010

(65) Prior Publication Data
US 2012/0313466 A1 Dec. 13, 2012

(30) Foreign Application Priority Data
Nov. 24, 2008 (DE) .......................... 10 2008 059 171

(51) Int. Cl.
| | |
|---|---|
| *H02K 9/00* | (2006.01) |
| *H02K 9/06* | (2006.01) |
| *F04D 25/08* | (2006.01) |
| *H02K 9/28* | (2006.01) |
| *H02K 3/51* | (2006.01) |
| *H02K 7/14* | (2006.01) |
| *H02K 11/00* | (2006.01) |

(52) U.S. Cl.
CPC ................ *H02K 9/06* (2013.01); *F04D 25/082* (2013.01); *H02K 9/28* (2013.01); *H02K 3/51* (2013.01); *H02K 7/14* (2013.01); *H02K 11/0073* (2013.01)

(58) Field of Classification Search
CPC ................................. H02K 3/34; H02K 15/10
USPC .................... 310/60 R, 62, 60 A, 61, 214, 215
See application file for complete search history.

(56) References Cited

U.S. PATENT DOCUMENTS 1,549,756 A * 8/1925 Farmer ............................ 310/62
1,691,696 A * 11/1928 Baum ............................. 310/54
(Continued)

FOREIGN PATENT DOCUMENTS

| CN | 2288542 Y | 8/1998 |
|---|---|---|
| CN | 1630165 A | 6/2005 |

(Continued)

OTHER PUBLICATIONS

Machine translation DE102006038909 (2008).*
(Continued)

*Primary Examiner* — Jose Gonzalez Quinone
(74) *Attorney, Agent, or Firm* — Christie, Parker & Hale, LLP (57) ABSTRACT

A drive motor, in particular for a fan wheel of a radiator of a motor vehicle, is provided. The drive motor comprising a stator, and a rotor rotating about an axis of rotation relative to the stator, which is driven in cooperation with the stator. Means for generating an air flow for cooling at least one component of the drive motor are arranged on the rotor.

7 Claims, 6 Drawing Sheets

(56) References Cited

U.S. PATENT DOCUMENTS

| | | | |
|---|---|---|---|
| 2,970,234 A * | 1/1961 | Erickson | 310/63 |
| 5,095,236 A | 3/1992 | Walsh | |
| 6,707,181 B1 | 3/2004 | Fougner et al. | |
| 2002/0185922 A1* | 12/2002 | Radomile et al. | 310/61 |
| 2004/0056539 A1* | 3/2004 | Du | 310/45 |
| 2004/0100154 A1 | 5/2004 | Rahman et al. | |
| 2005/0134126 A1 | 6/2005 | Ibach | |
| 2006/0138893 A1* | 6/2006 | Noda et al. | 310/215 |
| 2007/0273220 A1* | 11/2007 | Koyama et al. | 310/58 |
| 2008/0203830 A1* | 8/2008 | Simofi-Ilyes et al. | 310/43 |
| 2010/0054968 A1* | 3/2010 | Fleischmann et al. | 417/366 |

FOREIGN PATENT DOCUMENTS

| | | | |
|---|---|---|---|
| CN | 1723597 A | | 1/2006 |
| CN | 101056017 A | | 10/2007 |
| CN | 101090216 A | | 12/2007 |
| CN | 101617126 A | | 12/2009 |
| DE | 101 19 450 A1 | | 11/2002 |
| DE | 103 48 214 A1 | | 6/2004 |
| DE | 103 52 868 A1 | | 6/2004 |
| DE | 10 2006 058 713 A1 | | 10/2007 |
| DE | 10 2006 038 909 A1 | | 2/2008 |
| DE | 102006038909 A1 | * | 2/2008 |
| EP | 244134 A1 | * | 11/1987 |
| EP | 766366 A1 | * | 4/1997 |
| EP | 1 564 869 B1 | | 8/2005 |
| EP | 1 843 447 A1 | | 10/2007 |
| FR | 2 778 284 A1 | | 11/1999 |
| FR | 2778283 A1 | * | 11/1999 |
| FR | 2778284 A1 | * | 11/1999 |
| JP | 59-230448 | | 12/1984 |
| JP | 59230448 A | * | 12/1984 |
| JP | 09-240249 | | 9/1997 |
| JP | 2000-32700 A | | 1/2000 |
| JP | 2007-306741 A | | 11/2007 |
| TW | 200822499 A | | 5/2008 |
| WO | WO 2007042362 A1 | * | 4/2007 |
| WO | WO 2008/061502 A1 | | 5/2008 |

OTHER PUBLICATIONS

Machine Translation FR2778284 (1999).*
Machine Translation WO2007042362 (2007).*
Chinese Examination Report dated Nov. 13, 2012 for Application No. 200980146828.5, 13 sheets.
International Search Report, dated Feb. 3, 2001, corresponding to PCT/DE2009/001648, 12 pages.
Abstract of JP 59230448 A, ITO, Published Dec. 25, 1984, 1 page.
English translation of International Preliminary Report on Patentability dated May 31, 2011 for corresponding PCT/DE2009/001648, 12 sheets.
English translation of Japanese Office action for Patent Application No. 2011-536738, mailed Dec. 17, 2013, 2 pages.
Chinese Search Report for Patent Application No. 200980146828.5, dated Nov. 8, 2013, 2 pages.

* cited by examiner

DRIVE MOTOR HAVING INTEGRATED COOLING

CROSS-REFERENCE TO A RELATED APPLICATION

This application is a National Phase Patent Application of International Patent Application Number PCT/EP2009/001648, filed on Nov. 23, 2009, which claims priority of German Patent Application Number 10 2008 059 171.8, filed on Nov. 24, 2008.

BACKGROUND

This invention relates to a drive motor in particular for a fan wheel of a radiator of a motor vehicle.

Such drive motor includes a stator and a rotor rotating about an axis of rotation relative to the stator. The drive motor can be formed as electric motor, but for example also as internal combustion engine, in which a rotor rotates relative to a stator, and for example serves for driving a fan wheel of a radiator with which an internal combustion engine of a motor vehicle is cooled.

In operation of a drive motor it is required to cool individual components of the drive motor, in order to prevent overheating of the components. In an electric drive motor formed as d.c. machine, this applies for example to a commutator which for commutation includes brushes which slidingly rest against the rotor and are heated as a result of the rotary movement of the rotor in operation of the drive motor. Current-carrying windings for generating a magnetic field and an electronic control unit of the drive motor likewise must be cooled in operation, in order to ensure a reliable operation of the drive motor.

In a drive motor known from DE 103 48 214 A1 a stator carrying windings includes cooling tubes through which a coolant flows for cooling the windings. The use of such cooling tubes for cooling windings only is possible when the windings are firmly arranged on a stator.

For cooling a commutator in particular including brushes, a drive motor known from DE 101 19 450 A1 in the form of a commuted d.c. machine uses an air flow which is generated by a fan connected with the d.c. machine and is guided through the d.c. machine in axial direction. For guiding the air flow channels are provided in a stator, which guide the air flow through the d.c. machine.

In an electric motor known from U.S. Pat. No. 5,095,236 a fan wheel is provided on a drive shaft in addition to a rotor carrying windings for cooling the motor. Fan wheel and rotor are formed separately.

SUMMARY

It is the object underlying the present invention to create a drive motor which in a simple and efficient manner provides for cooling its components while minimizing the components required therefor.

It is provided that means for generating an air flow for cooling at least one component of the drive motor are arranged on the rotor.

The present invention proceeds from the idea to form means for generating an air flow directly at the rotor and utilize the rotary movement of the rotor in operation of the drive motor for generating the air flow, in that the means for generating the air flow as a result of the rotary movement of the rotor move air through the drive motor for cooling and thus cause an air flow through the drive motor in particular along the components to be cooled. The means for generating an air flow thus are part of the rotor and for example integrated in a component of the rotor, so that no additional components formed separate from the rotor are required for cooling.

When the drive motor constitutes an electric d.c. machine, the rotor includes a rotor base body and at least one winding arranged on the rotor base body. For electrically insulating the winding from the rotor base body for example formed of individual rotor sheets, an insulating disk can be provided, which is arranged between winding and rotor base body and is made of an electrically insulating material, for example plastics. In a preferred aspect, the means for generating the air flow then are arranged on the insulating disk, in that for example blade portions for generating an air flow are integrated in the insulating disk. The blade portions are formed in the manner of blades and serve to move air through the drive motor such that a continuous air flow is obtained through the drive motor along the components to be cooled. By means of the blade portions on the insulating disk of the rotor, the rotary movement of the rotor in operation of the drive motor is utilized for generating an air flow for cooling components of the drive motor, wherein no additional measures, in particular no additional external fan or the like must be provided for generating an air flow. In a simple and effective way, the blade portions allow to generate a cooling air flow by utilizing the rotary movement of the rotor.

The rotor base body can include one or two insulating disks which are arranged on the axial front-side end faces of the rotor base body and cover the front-side end faces in an insulating manner. Corresponding to the plane of extension of the front-side end faces, the insulating disks then extend transverse to the axis of rotation of the rotor, are firmly connected with the rotor base body and in operation of the drive motor rotate together with the rotor base body.

In another exemplary aspect it is also conceivable to integrate blade portions directly into the rotor base body or into a commutator of the rotor, for example mold the same onto the rotor base body or the commutator.

To obtain an air flow through the drive motor, which is especially suited for cooling individual components, for example for cooling a commutator arranged on the rotor, the rotor base body can include openings which serve as passage for the air flow. Due to the formation of the openings, the air flow can selectively be passed along the components to be cooled, for example along the commutator, wherein care should be taken that the openings are adjusted to the blade portions in terms of arrangement and opening area for efficiently generating an air flow.

The means for generating the air flow are formed for example in the manner of a radial fan or an axial fan and are arranged directly on the rotor. In a radial fan, air is conveyed radially to the outside—for example by suitable blade portions—, whereas in an axial fan air is moved in axial direction.

The air flow advantageously is at least partly directed axially, i.e. along the axis of rotation of the rotor, and flows along the components to be cooled, for example along a commutator, an electronic control unit or along windings of the drive motor. The means for generating the air flow ensure a continuous air movement in operation of the drive motor and thus a continuous and effective cooling of the components.

Axially along the axis of rotation, the stator of the drive motor can be sealed on the one hand by a housing cover and on the other hand by an electronic control unit, which each include at least one opening as passage for the air flow. If the drive motor for driving a fan wheel of a vehicle is connected with the fan wheel via a receptacle, corresponding openings are also provided at the receptacle and serve as passage for the air flow. The openings on the side of the electronic control unit can be integrated for example into cooling fins of the electronic control unit. Driven and effected by the means for generating the air flow on the rotor, an air flow can then be generated as a result of the rotary movement of the rotor about the axis of rotation, which flows through the openings of the electronic control unit into the drive motor, along the components to be cooled—for example along the commutator, the electronic control unit and the windings—and through the rotor and exits from the drive motor on the side of the housing cover. In this way, a continuous air flow through the drive motor is generated, which in a targeted manner can be passed along the components to be cooled and hence provides an effective air cooling of the drive motor.

BRIEF DESCRIPTION OF THE DRAWINGS

The idea underlying the invention will be explained in detail below with reference to the embodiments illustrated in the Figures.

DETAILED DESCRIPTION

Figure 1:
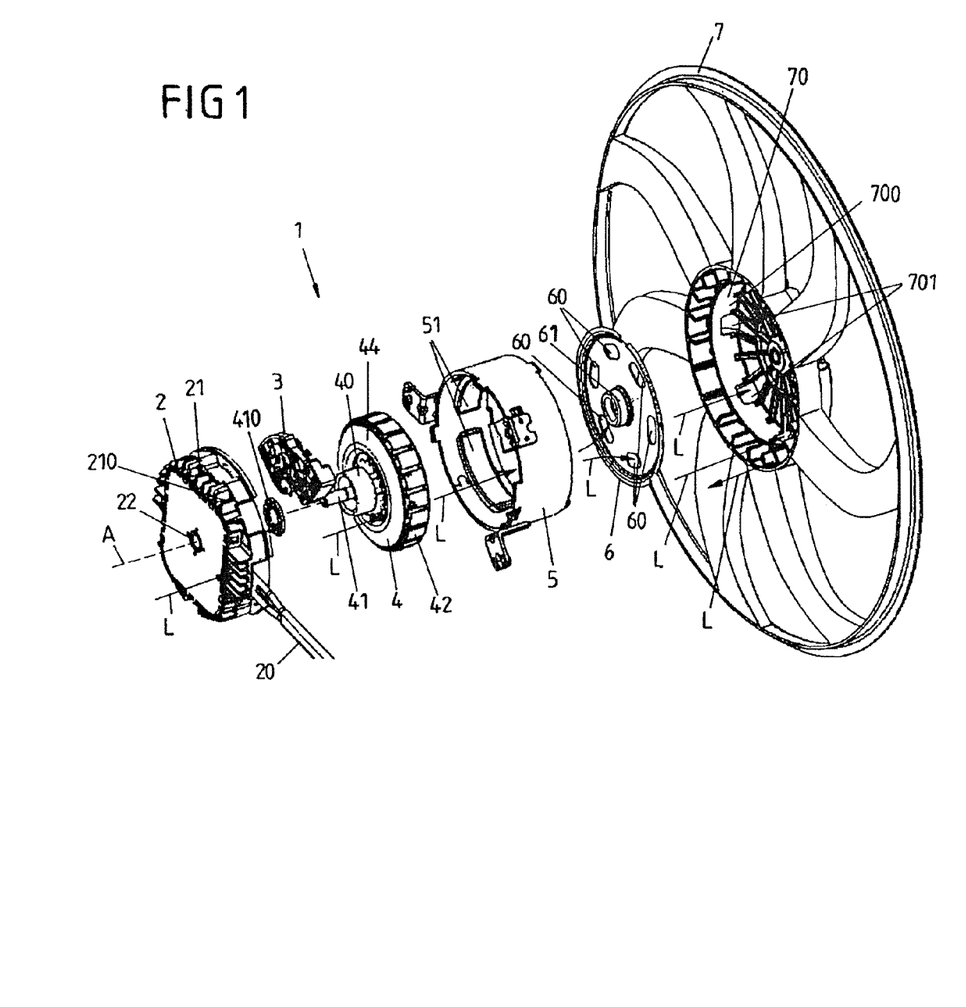
FIG. 1 shows a perspective exploded representation of a drive motor for driving a fan wheel.

FIG. 1 shows a perspective exploded view of a drive motor 1 constituting an electric d.c. machine, which serves for driving a fan wheel 7 for example for a fan of a motor vehicle. The drive motor 1 includes a stator 5 with magnets 51, which is firmly arranged on a vehicle component and in which a rotor 4 is rotatably arranged about an axis of rotation A. On its one side, the stator 5 is closed by an electronic control unit 2 and on its other side by a housing cover 6, wherein bearing points 22, 61 for supporting a drive shaft 41 of the rotor 4 are each formed in the electronic control unit 2 and the housing cover 6. A retaining ring 410 is provided at the drive shaft 41, in order to fix the rotor 4 in the stator 5. The electronic control unit 2 is connected with an electric supply line 20, via which the drive motor 1 is supplied with electricity, and includes cooling fins 21 for cooling a circuit arrangement of the electronic control unit 2.

Figure 2:
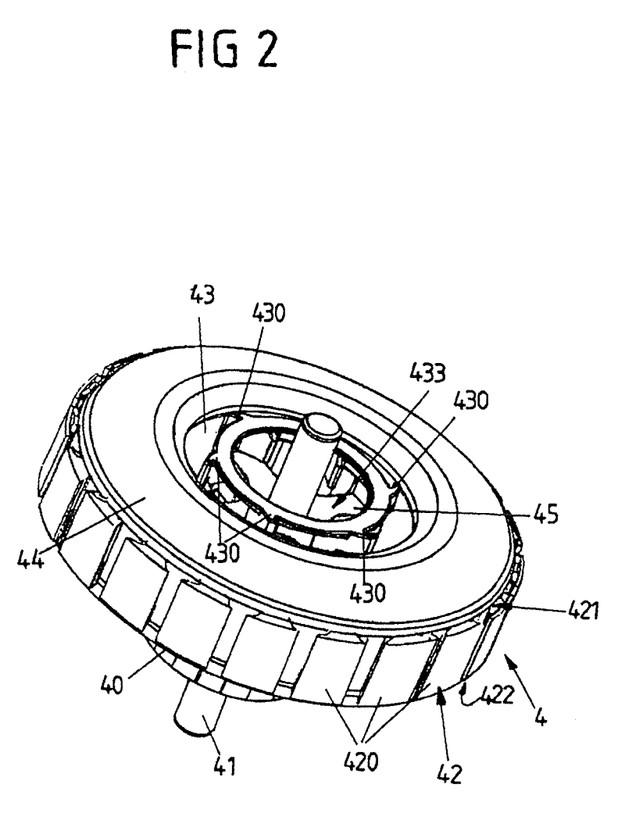
FIG. 2 shows a first perspective view of a rotor with insulating disk arranged thereon.
Figure 3:
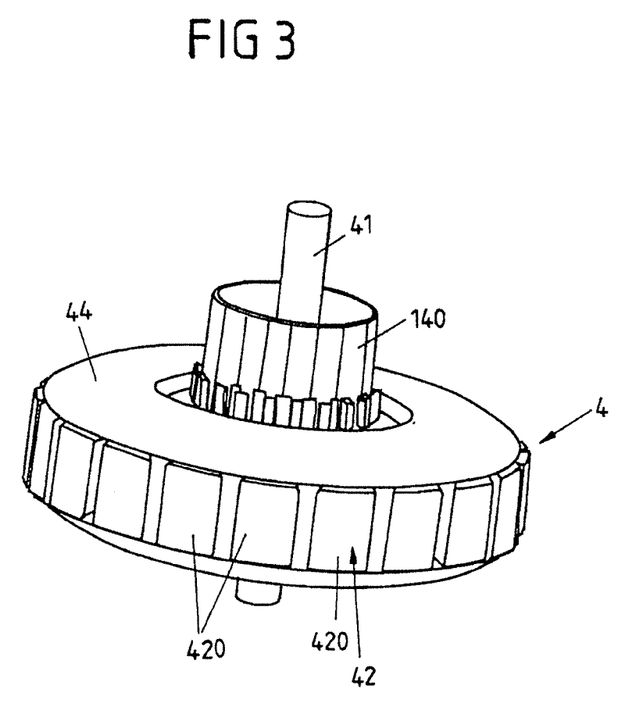
FIG. 3 shows a second perspective view of a rotor.

Separate views of the rotor 4 are shown in FIGS. 2 and 3. The drive motor 1 constitutes an electric d.c. machine in which the rotor 4 carries electrically conductive windings 44 arranged on a rotor base body 42. The rotor base body 42 includes poles 420 around which the windings 44 are wound such that a magnetic field generated when current flows through the windings 44 cooperates with the magnetic field of the magnets 51 of the stator 5 for generating a rotary movement of the rotor 4 about the axis of rotation A. Concentrically with respect to the drive shaft 41, the rotor 4 includes a commutator 40 which via brushes arranged on a brush holder 3 (see FIG. 1) supplies the windings 44 with direct current. In operation of the drive motor 1 the brushes of the brush holder 3 slide along the outer shell surface of the commutator 40, wherein the rotary movement of the rotor 4 and the associated rotary movement of the commutator 40 cause a mechanical commutation due to which the windings 44 are supplied with electricity for generating a rotary movement of the rotor 4 about the axis of rotation A, such that the magnetic field generated by the windings 44 in cooperation with the magnetic field of the magnets 51 at the stator 5 drives the rotor 4.

Between the rotor base body 42 and the windings 44 an insulating disk 43 formed of an electrically insulating material, for example plastics, is provided, which is arranged between the windings 44 and a front-side end face 421 of the rotor base body 42 such that the windings 44 are electrically insulated from the rotor base body 42, which for example is formed of individual rotor sheets. A further insulating disk 43 can be arranged at the opposite front-side end face 422 of the rotor base body 42, which faces the commutator 41.

Since the brushes slidingly rest against the commutator 40 and the current flows through the brushes on the brush holder 3, the commutator 40 and the windings 44, the components of the drive motor 1 are heated in operation of the drive motor 1. This applies in particular to the electronic control unit 2, the brushes on the brush holder 3, the commutator 40 and the windings 44 of the rotor 4.

To cool the components of the drive motor 1, in particular the electronic control unit 2, the brushes of the brush holder 3, the commutator 40 and the windings 44 in operation of the drive motor 1, blade portions 430 are formed on the insulating disk 43 arranged on the front-side end face 421 on the rotor base body 42, which in operation of the drive motor 1 generate an air flow L as a result of a rotary movement about the axis of rotation A of the rotor 4, which for cooling flows through the drive motor 1 along the components to be cooled.

Figure 4:
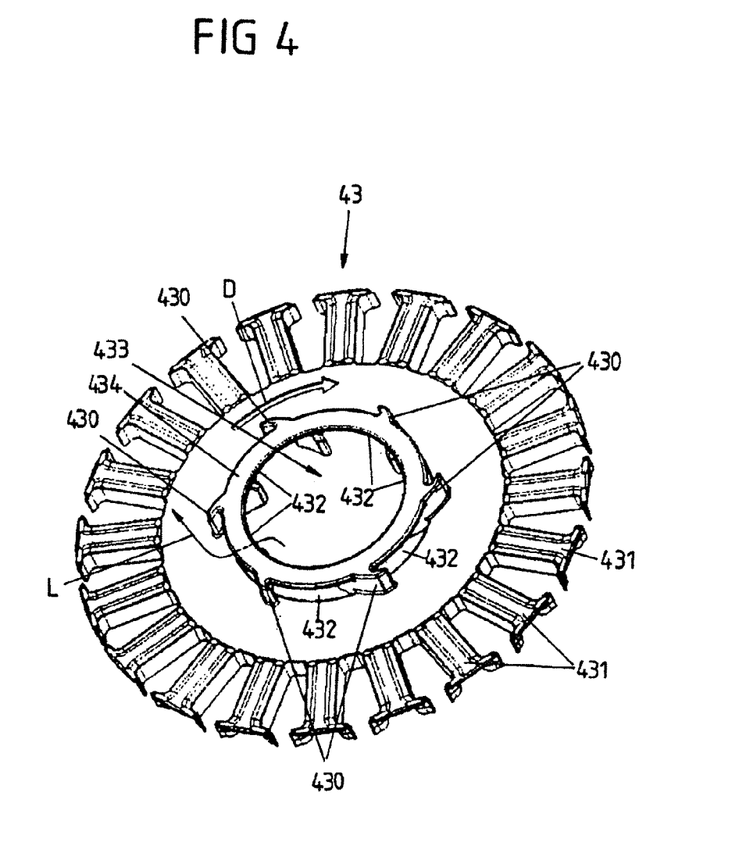
FIG. 4 shows a separate perspective view of an insulating disk.

A separate view of the insulating disk 43 is shown in FIG. 4. The insulating disk 43 includes pole portions 431, which with the insulating disk 43 arranged on the rotor base body 42 enclose the poles 420 of the rotor base body 42 and thus insulate the same against the windings 44. The insulating disk 43 includes a central recess 433, through which the drive shaft 41 of the rotor 4 extends when the insulating disk 43 is mounted (see FIG. 2). Around the central recess 433 six blade portions 430 are arranged, which serve the generation of an air flow L and between which, axially defined by a ring 434, openings 432 are located, through which the air flow L flows, which is generated by the blade portions 430.

In operation of the drive motor 1 the rotor 4 rotates together with the insulating disk 43, which is firmly arranged on the rotor base body 42, in the direction of rotation D about the axis of rotation A. As a result of the rotary movement in the direction of rotation D, the blade portions 430 arranged on the insulating disk 43 move and generate an air flow L, which delivers air from the region of the recess 433 through the openings 432 to the outside. Thus, the blade portions 430 suck in air from the region of the recess 433 and press the same through the openings 432 to the outside.

Figure 5:
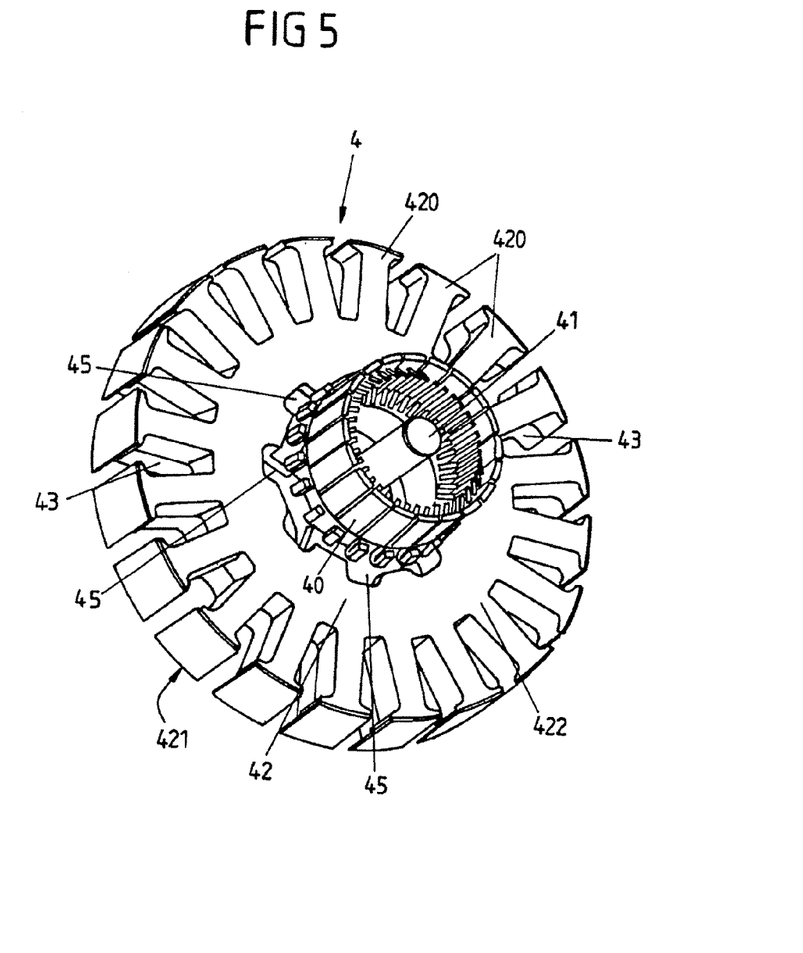
FIG. 5 shows a separate perspective view of a rotor base body of a rotor with commutator arranged thereon.
Figure 6:
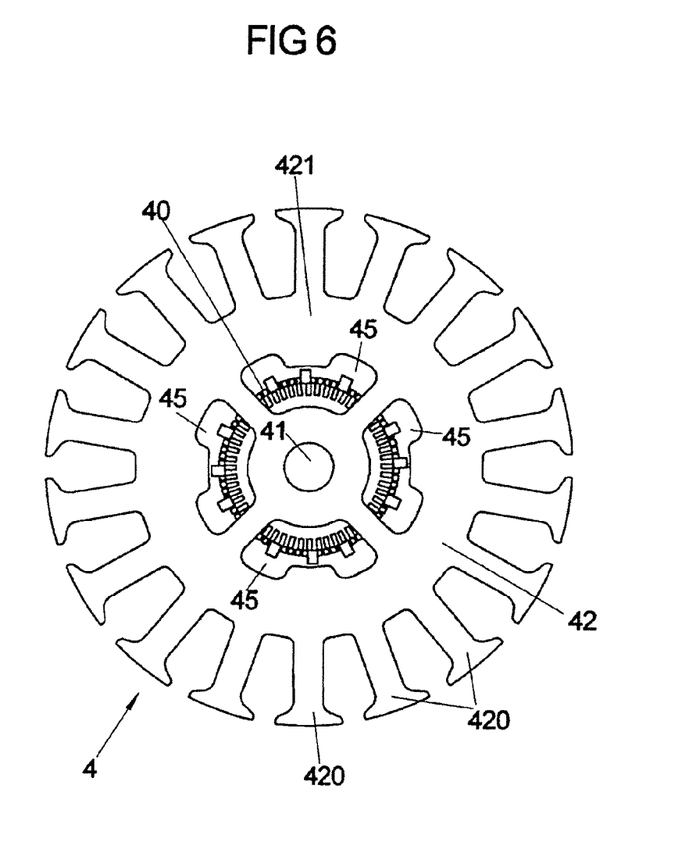
FIG. 6 shows a top view of a front-side end face of a rotor base body.

The insulating disk 43 is arranged on the rotor base body 42. Separate views of the rotor base body 42 are shown in FIGS. 5 and 6, from which it can be taken that the rotor base body 42 includes openings 45 directed axially along the axis of rotation A in its central region, which are arranged in the region of the central recess 433 of the insulating disk 43. As can be taken from the top view of FIG. 6, the openings 45 extend towards the commutator 40, so that an air flow L is guided through the openings 45 along the commutator 40.

Through the openings 45, an air flow L directed axially through the rotor 4 is made possible in the interior of the drive motor 1. Furthermore, as shown in FIG. 1, openings 210 are formed at the cooling fins 21 of the electronic control unit 2 and openings 60 are formed at the housing cover 6 connected with the stator 5.

The drive motor 1 is arranged on a receptacle 70 of the fan wheel 7, wherein the receptacle 70 includes a wall portion 700 with openings 701 as passage for the air flow L. In operation of the drive motor 1 the rotor 4 is put into a rotary movement, due to which the blade portions 430 in the insulating disk 43 on the rotor base body 42 generate an air flow L which flows through the openings 210 of the cooling fins 21, the openings 45 in the rotor base body 42, the openings 60 of the housing cover 6 and the openings 701 of the wall portion 700 of the receptacle 70 of the fan wheel 7 in axial direction along the axis of rotation A through the drive motor 1 and in doing so sweeps along the components to be cooled, in particular along the electronic control unit 2, the brush holder 3, the commutator 40 and the windings 44. Due to the formation of the openings 210, 45, 60, 701, the air flow L can selectively be directed such that it flows around the components to be cooled and cools the same in operation of the drive motor 1.

With the blade portions 430 arranged on the insulating disk 43, the rotary movement of the rotor 4 in operation of the drive motor 1 is utilized for cooling the components of the drive motor 1. Further measures, in particular external fans or the like are not required for cooling the drive motor 1. By the blade portions 430, an air flow L flowing through the drive motor 1 in axial direction is generated in a targeted manner, which provides an efficient cooling of the components of the drive motor 1.

In the embodiment shown in the Figures, an insulating disk 43 only is provided on the front-side end face 421 of the rotor base body 42, which faces away from the commutator 40. In the same way, however, a correspondingly shaped insulating disk 43 can also be arranged on the opposite end face 422 facing the commutator 40, in order to improve the cooling.

It is also conceivable to mold means for generating an air flow L—for example blade portions in the manner of the blade portions 430 shown in FIG. 4—directly onto the rotor base body 42.

The idea underlying the invention is not limited to the embodiments described above, but can also be realized in accordance with completely different embodiments. For example, the described invention can be used in principle in all drive motors in which a rotor moves relative to a stator. In particular, the invention can be used in a multitude of different electric drive motors, not only d.c. machines, in that means for generating an air flow are provided on the rotor. A use of similar cooling means in addition is also conceivable for example in internal combustion engines.

In addition, means for generating an air flow other than the described blade portions can be used.

With the described measures an axial/radial fan for cooling components of a drive motor is integrated into a rotor of the drive motor, so that the rotary movement of the rotor is utilized for cooling in operation of the drive motor.

The invention claimed is:

1. A drive motor, in particular for a fan wheel of a radiator of a motor vehicle, comprising:
   a stator,
   a drive shaft,
   a rotor arranged on the drive shaft and comprising a rotor base body, at least one winding, and an insulating disk insulating the at least one winding from the rotor base body, wherein the rotor is configured to rotate about an axis of rotation relative to the stator and wherein the rotor is configured to be driven in cooperation with the stator,
   a commutator located on a first side of the rotor base body for commutating a current to electrically feed the at least one winding;
   an air flow generator for cooling at least one component of the drive motor on the rotor, wherein the air flow generator is integrally formed on the insulating disk located on a second side of the rotor base body in between the at least one winding and the rotor base body,
   wherein the rotor base body includes at least one opening extending from the first side to the second side through the rotor base body along the axis of rotation as a passage for air flow generated by the air flow generator, the at least one opening being located in the rotor base body such that it overlaps the commutator in a direction radial to the axis of rotation in order to cause an air flow along the commutator when the drive motor is operated,
   wherein the air flow generator is constituted to produce an air flow through the at least one opening of the rotor,
   wherein the insulating disk, for forming the air flow generator, comprises:
   a disk body and a central opening formed in the disk body, the drive shaft extending through the central opening,
   a multiplicity of blade portions axially protruding from the disk body and arranged about the central opening such that the blade portions are displaced with respect to each other in a circumferential direction about the central opening, and
   a ring element connecting the blade sections to each other at a side of the blade sections facing away from the disk body and axially confining airflow openings formed in between the blade portions,
   wherein the blade portions are constituted to cause an air flow through the airflow openings flowing radially outwards.

2. The drive motor according to claim 1, wherein the insulating disk is on a front-side end face of the rotor base body and extends transverse to the axis of rotation of the rotor.

3. The drive motor according to claim 1, further comprising another insulating disk wherein one insulating disk is located on each opposing front-side end face of the rotor base body.

4. The drive motor according to claim 1, wherein the air flow generator is a radial fan.

5. The drive motor according to claim 1, wherein in a region of the rotor the air flow is configured to be at least partly directed along the axis of rotation.

6. The drive motor according to claim 1, wherein the drive motor includes a housing cover sealing the stator along the axis of rotation, wherein the housing cover includes at least one opening as passage for the air flow.

7. The drive motor according to claim 1, wherein the drive motor is on a receptacle of a fan wheel on which at least one opening is formed as passage for the air flow.

* * * * *